(12) United States Patent (10) Patent No.: US 7,496,238 B2
Hong (45) Date of Patent: Feb. 24, 2009

(54) METHOD AND APPARATUS FOR RETOUCHING PHOTOGRAPHED IMAGE

(75) Inventor: Sei-won Hong, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 846 days.

(21) Appl. No.: 10/688,517

(22) Filed: Oct. 17, 2003

(65) Prior Publication Data

US 2004/0091237 A1 May 13, 2004

(30) Foreign Application Priority Data

Oct. 17, 2002 (KR) .................. 10-2002-0063530

(51) Int. Cl.
*G06K 9/40* (2006.01)
*H04N 5/228* (2006.01)

(52) U.S. Cl. .................... 382/254; 348/222.1

(58) Field of Classification Search .......... None
See application file for complete search history.

(56) References Cited

U.S. PATENT DOCUMENTS

| | | | | |
|---|---|---|---|---|
| 4,577,219 A | * | 3/1986 | Klie et al. | 358/540 |
| 5,555,194 A | * | 9/1996 | Cok | 382/254 |
| 5,966,122 A | | 10/1999 | Itoh | |
| 6,167,469 A | * | 12/2000 | Safai et al. | 710/62 |
| 6,285,410 B1 | | 9/2001 | Marni | |
| H2003 H | * | 11/2001 | Minner | 382/254 |
| 2003/0210335 A1 | * | 11/2003 | Carau et al. | 348/231.2 |

FOREIGN PATENT DOCUMENTS

| | | |
|---|---|---|
| JP | 2000-049984 A | 2/2000 |
| JP | 2002-203238 A | 7/2002 |
| KR | 10200010047297 A | 6/2001 |

OTHER PUBLICATIONS http://www.lonestardigital.com/rubber_stamp.htm—Published Dec. 15, 2001 (see Way Back Machine Results at the end of the article for date information).*

* cited by examiner

*Primary Examiner*—Charles Kim
(74) *Attorney, Agent, or Firm*—Drinker Biddle & Reath LLP

(57) ABSTRACT

A method and an apparatus for retouching a photographed image is provided. The method includes steps for recognizing an image region which is to be retouched in the photographed image and for retouching the recognized image region. Thus, the photographed image can be retouched easily using the digital camera by which the image was photographed without the use of a computer in an environment where portable printers for digital camera are supplied.

8 Claims, 11 Drawing Sheets

METHOD AND APPARATUS FOR RETOUCHING PHOTOGRAPHED IMAGE

This application claims priority to Korean Patent Application No. 2002-63530, filed on Oct. 17, 2002, in the Korean Intellectual Property Office, the disclosure of which is incorporated herein in its entirety by reference.

FIELD OF THE INVENTION

The present invention relates to a process for retouching an image photographed by a digital camera, and particularly, to a method and an apparatus for retouching a photographed image directly on the digital camera itself.

BACKGROUND OF THE INVENTION

Recently, digital cameras have been widely used instead of optical cameras. A digital camera is a camera functioning as a camera and a scanner by storing any visible object or landscape in a digital storing medium. An optical camera stores an image as an analog quantity; however, a digital camera divides the image into bit maps and records the respective brightness as a digital quantity. Since a digital camera is highly compatible with image data stored in a personal computer, a photographed image can be edited and retouched easily, stored in an inner memory (for example, a hard disk or a memory card), and transmitted to a networked computer.

An image photographed by a digital camera can be retouched by one of the following modes: a sepia mode, a tungsten mode, and a sharpening mode. The sepia mode is an image processing mode for processing the entire image into a mono-color such as brown, the tungsten mode is an image processing mode for processing the entire image by emphasizing the color red in the color balance, and the sharpening mode is a processing mode for clarifying the image by shielding low frequencies and maintaining high frequencies using a low frequency shielding filter.

However, in a conventional digital camera, noise (here, noise means irregular pixel values in the image) or an undesirable object in the image (for example, blemishes on a person's face) may be retouched using an image tool, such as Photoshop®, after transmitting image data to the computer.

SUMMARY OF THE INVENTION

The present invention provides a method of retouching a photographed image wherein an image photographed by a digital camera can be retouched directly on the digital camera itself.

Another embodiment of the present invention is directed to a method of retouching a photographed image which includes recognizing an image region to be retouched in the photographed image, and retouching the recognized image region.

The present invention is also directed to a method for retouching a photographed image using a digital camera which includes step (a) and step (b) wherein step (a) includes recognizing an image region which is to be retouched in the photographed image, and step(b) includes retouching the recognized image region, wherein steps (a) and (b) are performed on the digital camera.

The present invention also provides an apparatus for retouching a photographed image wherein an image photographed by a digital camera can be retouched directly on the digital camera itself.

A further embodiment of the present invention is directed to an apparatus for retouching a photographed image using the digital camera on which the image was taken which includes a region recognition unit for recognizing an image region which is to be retouched in the photographed image and outputting the recognized image region and a region retouch unit for retouching the recognized image region input from the region recognition unit and outputting the retouched result.

Another embodiment of the present invention is directed to an apparatus for retouching a photographed image using a digital camera which includes a region recognition unit for recognizing an image region which is to be retouched in the photographed image and outputting the recognized image region and a region retouch unit for retouching the recognized image region input from the region recognition unit and outputting the retouched result, wherein the region recognition unit and the region retouch unit are located on the digital camera.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
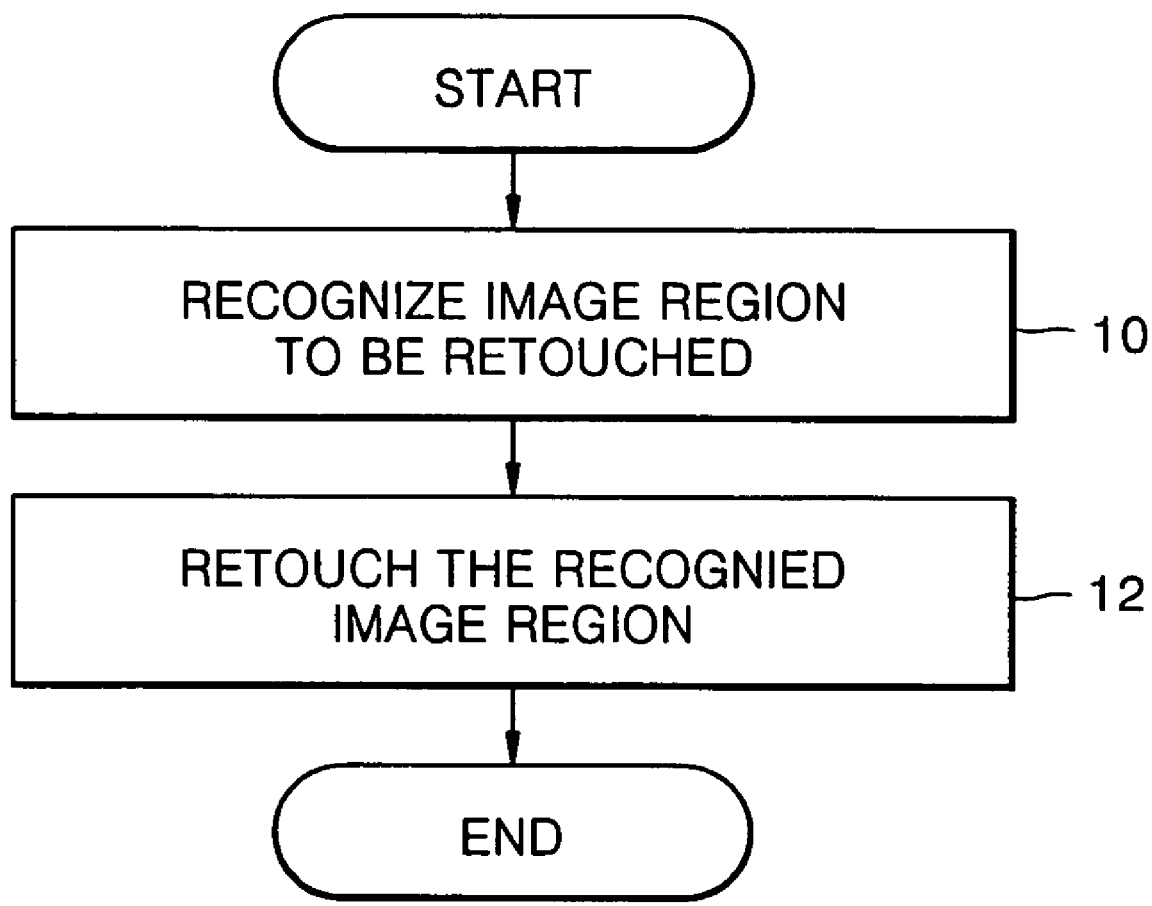
FIG. 1 is a flow chart of an embodiment of the retouching method of the present invention.

FIG. 1 is a flow chart of a photographed image retouching method according to an embodiment of the present invention and includes steps for recognizing and correcting an image region which needs to be retouched (steps 10 and 12).

First, an image region which needs to be retouched is recognized by the digital camera (step 10). If a user sets a recognition range for an image region containing noise or impurities, the corresponding image region is recognized by the digital camera.

Then, the recognized image region is retouched (step 12). When the region containing the noise or objects to be omitted in the photographed image is recognized by the digital camera in step 10, the recognized region is retouched.

Step 12 may also include a method of blurring. Blurring is a method of processing an image by removing high frequency components in order to soften the image. Low frequency is the frequency associated with a small changing rate of pixel values, and high frequency is the frequency associated with a large changing rate of pixel values. When the high frequency components are removed from the image, the changing rate of the pixel values is reduced, and accordingly, extreme values for neighboring pixels are also reduced to soften the image. Therefore, fine noise or impurities in the image can be weakened through the blurring process.

Figure 2:
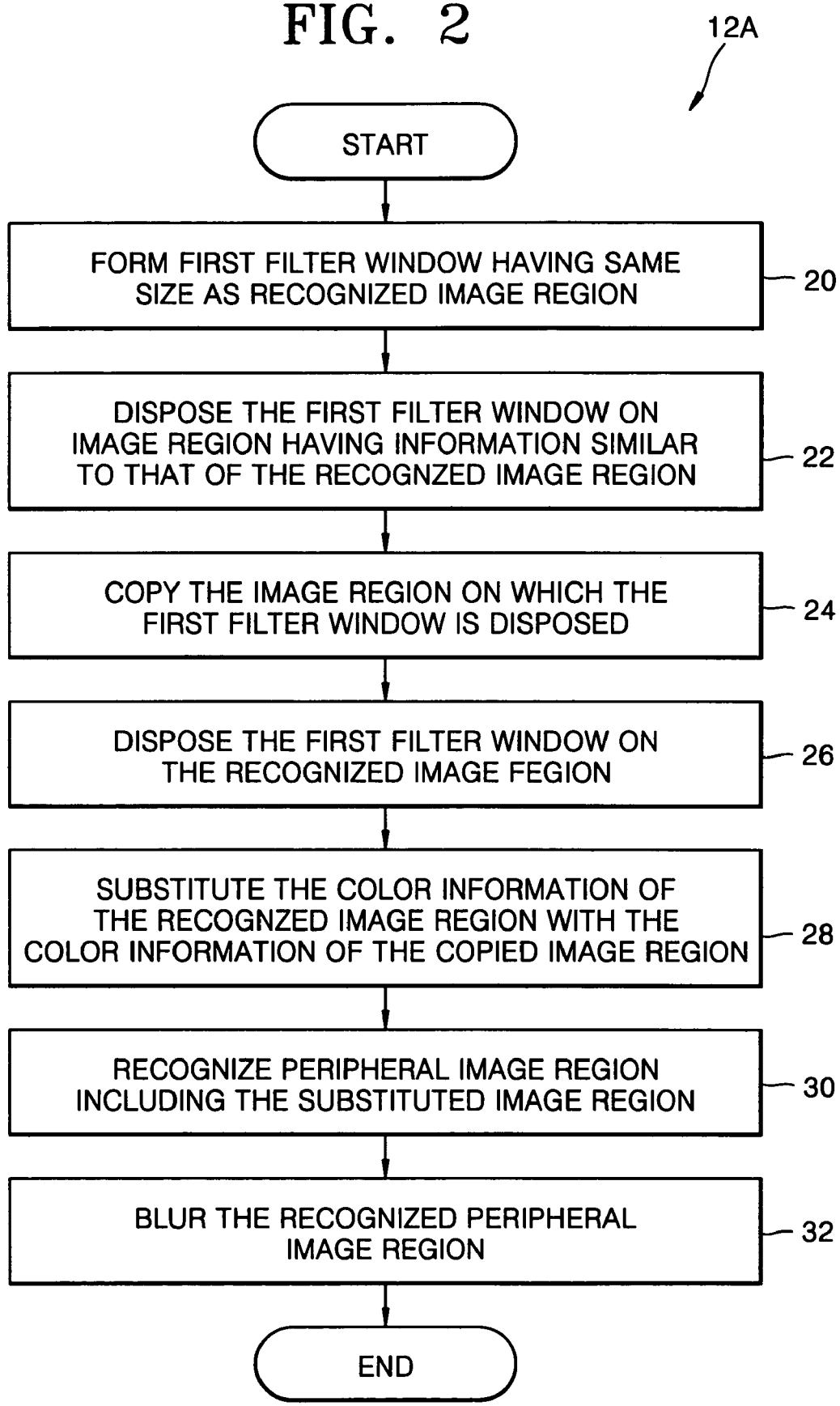
FIG. 2 is a flow chart of another embodiment for step 12 which is shown in FIG. 1.

FIG. 2 is a flow chart of another embodiment (step 12A) of the present invention shown in FIG. 1. Step 12A includes steps 20-32 for copying an image region having similar color information to that of the image region which needs to be retouched, substituting the color information, and blurring the image.

After performing step 10, a first filter window having the same size as the recognized image region is formed (step 20). The size of the first filter window can be controlled according to the size of recognized image region.

Additionally, the first filter window is disposed on the image region having color information similar to that of the recognized image region (step 22). For example, in order to remove impurities in the image, the first filter window is disposed on the image region having the similar color information to that the impurities.

The image region on which the first filter window is disposed is copied (step 24). For example, the image region having the same size as the first filter window disposed on a position having the similar color information to that of an area adjacent to the impurities is copied.

Then, the first filter window having color information of the copied image region is disposed on the recognized image region (step 26). For example, the image region copied as much as the first filter window is covered on the image region which is adjacent the impurities.

In addition, the color information of the recognized image region is substituted with the color information of the copied image region included in the first filter window (step 28). That is, the color information on the image region having the impurities is substituted with the color information of the copied image region to obtain an image region with no impurities.

After performing step 28, a peripheral image region including the substituted image region is recognized by the digital camera (step 30). For example, the impurities of the substituted image region are removed by the first filter window; however, edges of the image region may not be balanced with the remaining portion of the image around image regions. In order to balance the edge portions, the region containing the edge portions of the substituted image region is recognized by the digital camera to be blurred. The image region containing the edge portions of the first filter window is called a peripheral image region, and the peripheral image region is recognized by region setting by the user.

The recognized peripheral image region is blurred (step 32). The slight unbalance shown at the edge portions of the substituted image can be removed through blurring.

Figure 3:
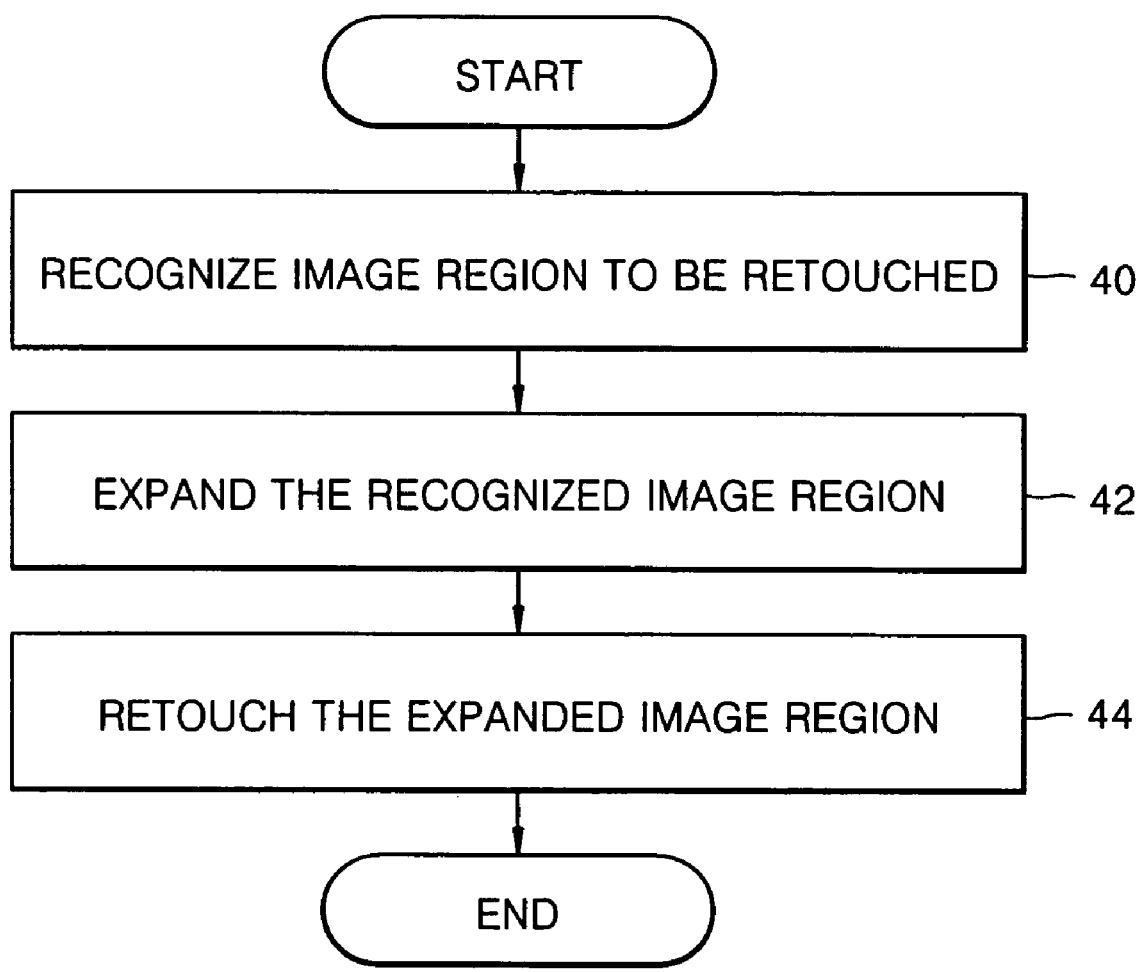
FIG. 3 is a flow chart for expanding a recognized image region in the photographed image retouching method shown in FIG. 1.

FIG. 3 is a flow chart containing a step for expanding the recognized image region in the photographed image retouching method shown in FIG. 1, and includes steps for correcting the expanded image region (steps 40-44).

An image region to be retouched in the photographed image is recognized by the digital camera (step 40).

Thereafter, the recognized image region is expanded (step 42) by moving coordinates of respective pixels in the recognized image as expanding magnifications. When there are pixels that are not assigned data values for use in expanding the image, then an interpolation method can be employed for assigning appropriate data values to empty pixels.

Next, the expanded image region is retouched (step 44).

Figure 4:
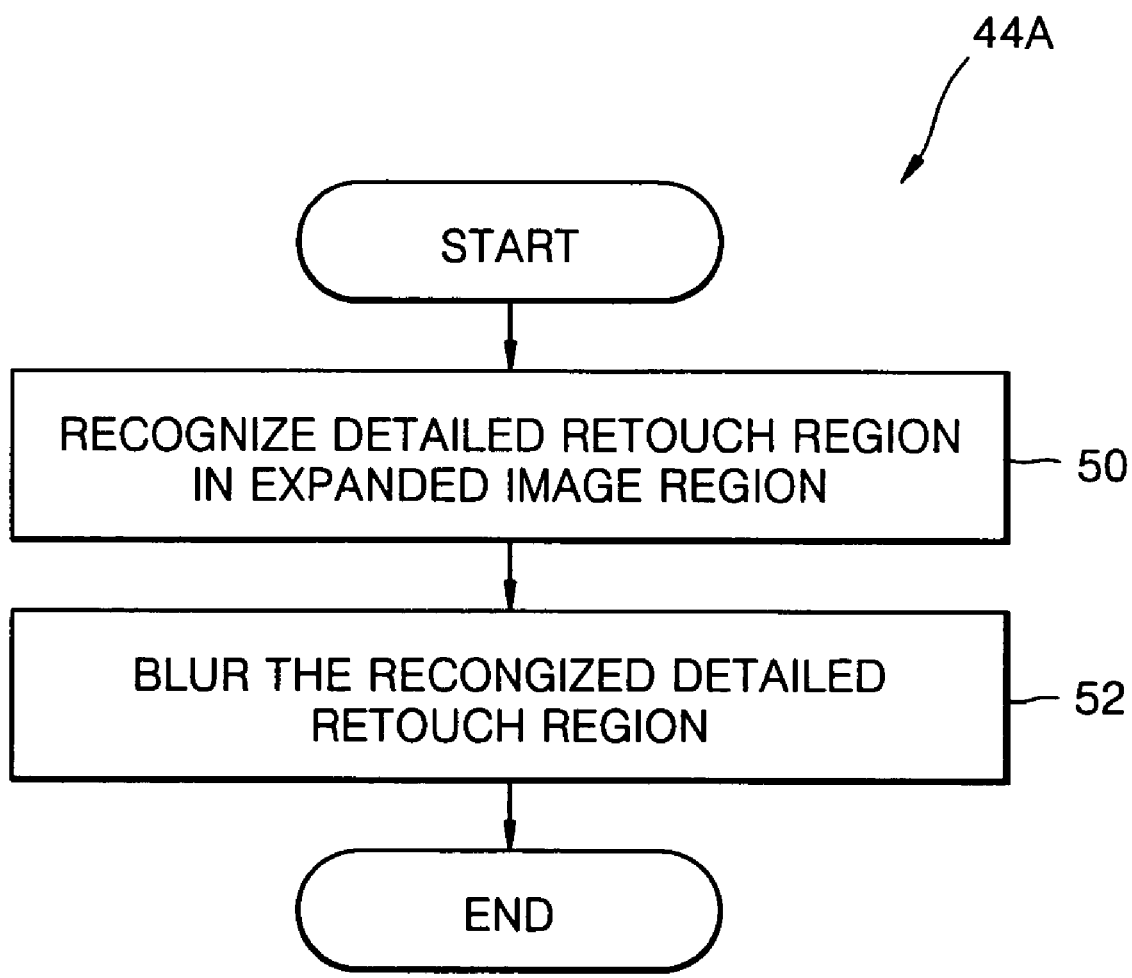
FIG. 4 is a flow chart of an embodiment of step 44 which is shown in FIG. 3.

FIG. 4 is a flow chart for describing another embodiment (44A) of step 44 as shown in FIG. 3 that includes steps for recognizing and blurring a fine retouch region in the expanded image region (steps 50 and 52).

After performing step 42, the detailed retouch region in the expanded image region is recognized by the digital camera (step 50). The fine retouch region is an image region that the user wishes to correct in the expanded image region. The region set by the user is recognized as the detailed retouch region.

Thereafter, the recognized detailed retouch region is blurred (step 52).

Figure 5:
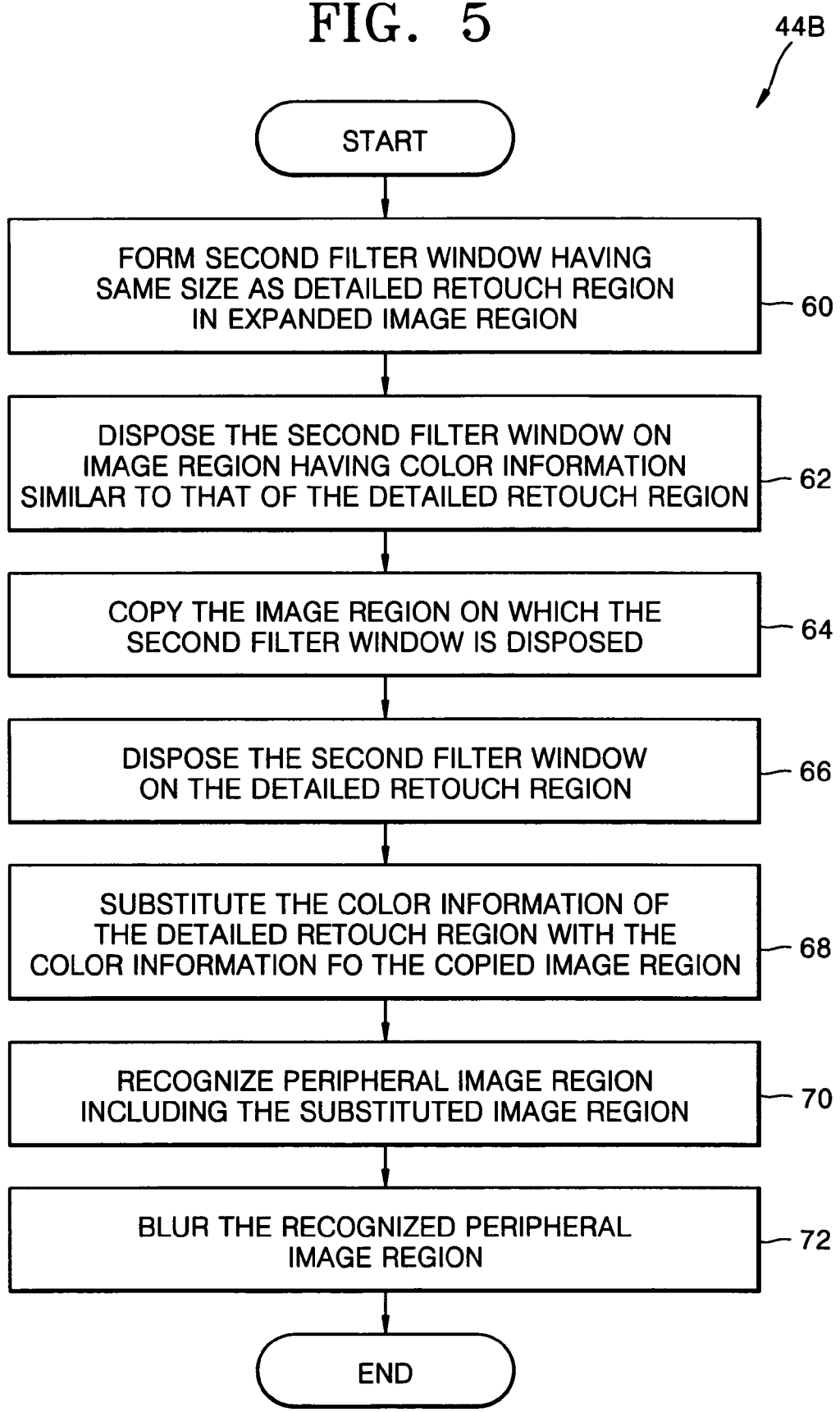
FIG. 5 is a flow chart of another embodiment of step 44 which is shown in FIG. 3.

FIG. 5 is a flow chart for describing a further embodiment (44B) of step 44 as shown in FIG. 3 that includes steps for copying an image region having color information similar to that of the detailed retouch region, substituting color information, and blurring the image (steps 60~72).

After performing step 42, a second filter window of the same size as the detailed retouch region in the expanded image region is formed (step 60). The size of the second filter window can be controlled according to the size of the detailed retouch region.

The second filter window, which is disposed on an image region having color information similar to that of the detailed retouch region, is disposed (step 62). For example, the second filter window is disposed on the image region having color information similar to that of an area adjacent to the impurities in order to correct the detailed retouch region in which the impurities exist.

In addition, the image region on which the second filter window is disposed is copied (step 64). For example, the image region is copied as large as the second filter window which is disposed on a portion having color information similar to that of the area adjacent to the impurities.

The second filter window, having color information of the copied image region, is disposed on the detailed retouch region (step 66). That is, the image region copied as large as the second filter window is disposed on the detailed retouch region in which the impurities exist.

After performing step 66, the color information on the detailed retouch region on which the second filter window is disposed is substituted with color information of the copied image region (step 68). For example, the color information of the detailed retouch region in which the impurities exist is substituted with the color information of the copied image region. Accordingly, the image region without the impurities can be obtained from the image region having the impurities through color information substitution.

Additionally, the peripheral image region including the substituted detailed retouch region is recognized by a digital camera (step 70). For example, the impurities of the detailed retouch region are removed by the second filter window; however, edge portions of the substituted detailed retouch region may not be balanced with other image regions. In order to balance the edge portions, the peripheral image region including the edge portions of the substituted detailed retouch region is recognized.

The recognized peripheral image region is blurred (step 72). The fine image differences shown at the edge portions of the substituted detailed retouch region can be removed through blurring.

Constructions and operations of the photographed image retouching apparatus according to the present invention will be described as follows with reference to accompanying drawings.

Figure 6:
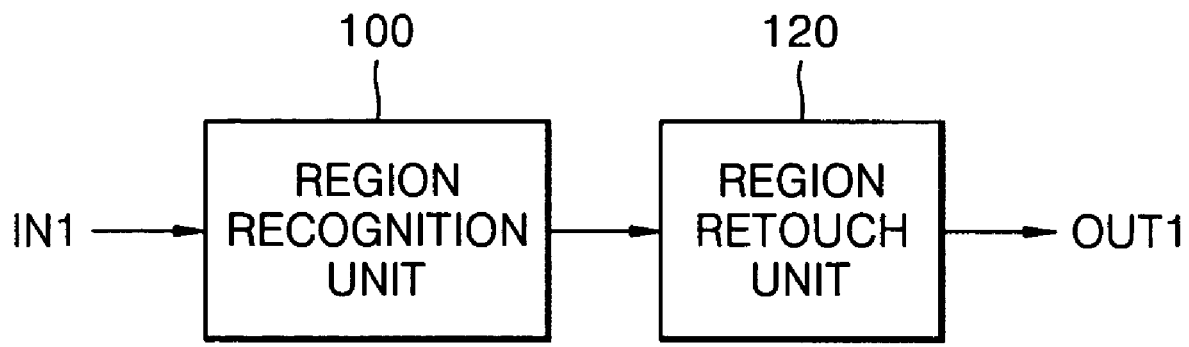
FIG. 6 is a block diagram of an embodiment of a photographed image retouching apparatus according to the present invention.

FIG. 6 is a block diagram of the photographed image retouching apparatus according to an embodiment of the present invention. The apparatus includes a region recognition unit 100 and a region retouch unit 120.

The region recognition unit 100 recognizes the image region, which is to be retouched in a photographed image region, and outputs the recognized image region (step 10). For example, when the user sets a range for an image region in which noise or impurities are seen in the photographed image input through an input terminal IN1, the region recognition unit 100 recognizes the set image region and outputs the recognized result to the region retouch unit 120.

The region retouch unit 120 retouches the recognized image region input from the region recognition unit 100, and outputs the retouched result through an output terminal OUT1 (step 12). An example of the region retouch unit 120 may include a blurring unit (not shown) for blurring the recognized image region input from the region recognition unit 100 and outputting the blurred image region.

Figure 7:
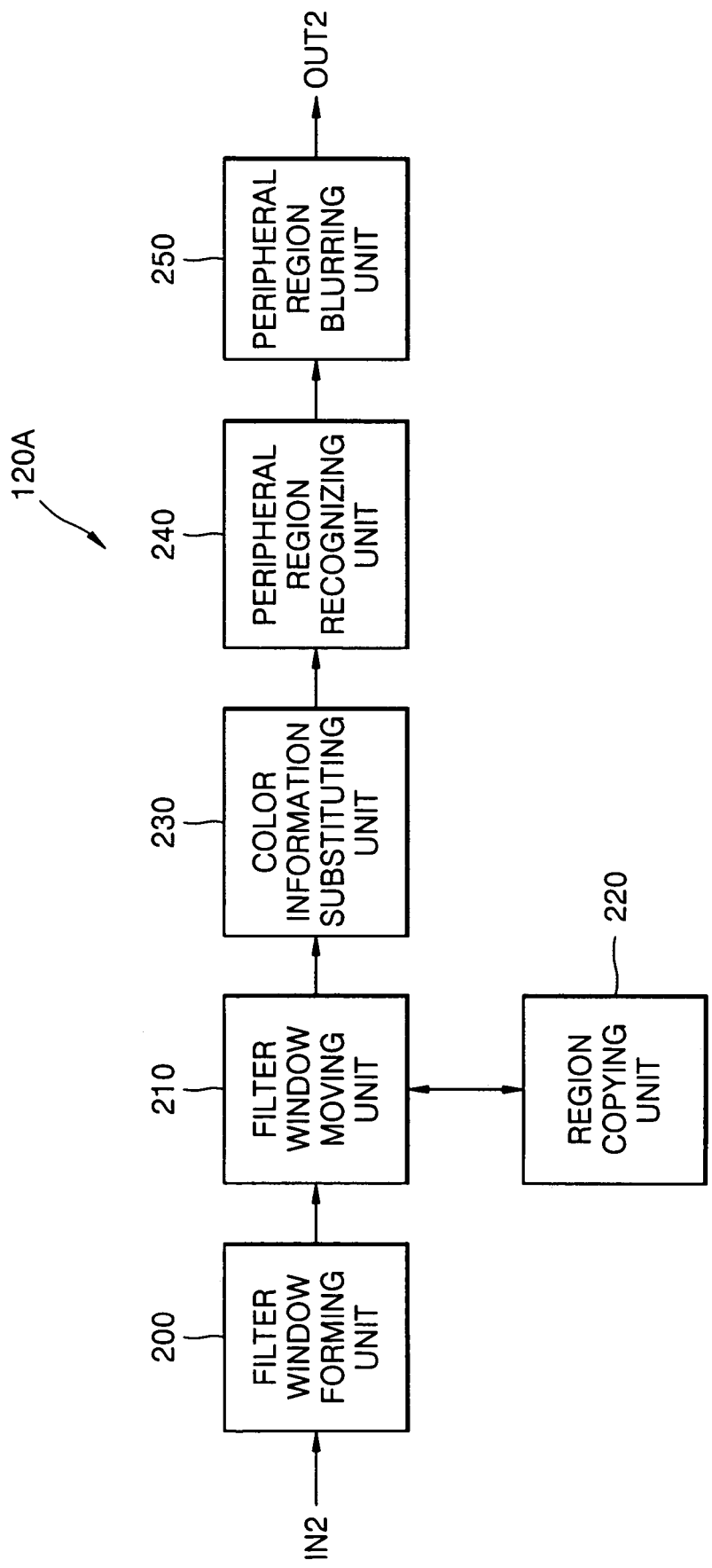
FIG. 7 is a block diagram of another embodiment of a region retouching unit which is shown in FIG. 6.

FIG. 7 is a block diagram of another embodiment (120A) of the region retouch unit 120 as shown in FIG. 6. The region retouch unit 120A includes a filter window forming unit 200, a filter window moving unit 210, a region copying unit 220, a color information substituting unit 230, a peripheral region recognizing unit 240, and a peripheral region blurring unit 250.

The filter window forming unit 200 forms the first filter window having the same size as the recognized image region and outputs the formed first filter window. The size of the window formed by the filter window forming unit 200 varies, depending on the size of the area of the recognized image region. The window may include several windows having selective sizes, or may be a window that can be adjusted. For example, the filter window forming unit 200 receives the recognized image region from the region recognition unit 100 through an input terminal IN2, forms the first filter window having the same size as the recognized image region, and outputs the first filter window to the filter window moving unit 210 (step 20).

The filter window moving unit 210 moves the first filter window received from the filter window forming unit 200 on a screen of the digital camera, and outputs the moved result (steps 22 and 26). For example, the filter window moving unit 210 moves the first filter window to the image region having image information similar to that of the recognized image region, and outputs the moved result to the region copying unit 220. Also, the filter window moving unit 210 moves the first filter window including the copied image region to the recognized image region, and outputs the moved result to the color information substituting unit 230.

The region copying unit 220 copies the image region on which the first filter window is disposed, and outputs the copied image region in response to receive the moved result of the first filter window. For example, the region copying unit 220 receives the moved result of the first filter window input from the filter window moving unit 210, copies the color information corresponding to the image region on which the first filter window is disposed, and outputs the copied result to the filter window moving unit 210 (step 24).

The color information substituting unit 230 substitutes the color information of the recognized image region with the color information of the copied image region in response to receiving the moved result of the first filter window including the copied image region from the filter window moving unit 210, and outputs the substituted result (step 28). For example, the color information substituting unit 230 receives the moved result of the first filter window on the copied image region from the filter window moving unit 210, substitutes the color information on the recognized image region with the color information of the image region copied by the region copying unit 220, and outputs the substituted result to the peripheral region recognizing unit 240.

The peripheral region recognizing unit 240 recognizes the peripheral image region including the substituted image region in response to receiving the substituted image region from the color information substituting unit 230, and outputs the recognized peripheral image region (step 30). For example, the peripheral region recognizing unit 240 recognizes the image region including edge portions of the first filter window. The size of the peripheral image region can be controlled by the user.

The peripheral region blurring unit 250 blurs the recognized peripheral image region input from the peripheral region recognizing unit 240, and outputs the blurred peripheral image region (step 32). For example, the peripheral region blurring unit 250 blurs the recognized peripheral image region input from the peripheral region recognizing unit 240, and outputs the blurred peripheral image region through an output terminal OUT2. Therefore, the noise shown in the image can be removed through blurring.

Figure 8:
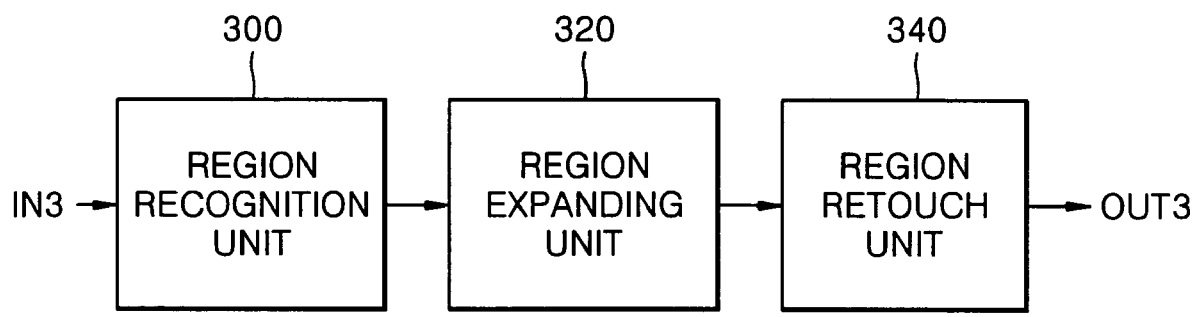
FIG. 8 is a block diagram of an embodiment of the photographed image retouching apparatus including a region expanding unit.

FIG. 8 is a block diagram of the photographed image retouching apparatus further including a region expanding unit 120 according to another embodiment of the present invention.

A region recognition unit 300 recognizes an image region which is to be retouched in the photographed image, and outputs the recognized image region (step 30). For example, when the user sets a rough range for the image region in which noise or impurities exist in the photographed image, the region recognition unit 300 recognizes the set image region, and outputs the recognized result to the region expanding unit 320.

The region expanding unit 320 expands the recognized image region input from the region recognition unit 300 and outputs the expanded image region (step 42). For example, the region expanding unit 320 uses a nearest neighbor interpolation method or a zero-order interpolation method to expand the size of an image. The nearest neighbor interpolation method is a method of assigning a neighboring pixel value to an empty pixel so as to expand the image, and the zero-order interpolation method is a method of substituting an average value of surrounding pixels to an empty pixel in the expanded image. The region expanding unit 320 expands the recognized image region input from the region recognition unit 300 and outputs the expanded image region to a region retouching unit 340.

The region retouching unit 340 retouches the expanded image region input from the region expanding unit 320 and outputs the retouched result (step 44). The region retouching unit 340 retouches the recognized image region and outputs the retouched result through an output terminal OUT3.

Figure 9:
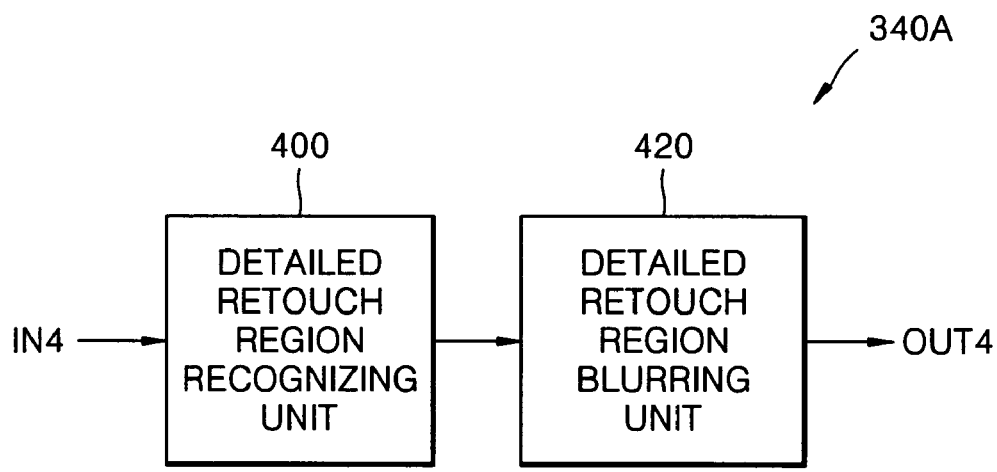
FIG. 9 is a block diagram of a region retouching unit according to an embodiment of the present invention as shown in FIG. 8.

FIG. 9 is a block diagram of another embodiment 340A of the region retouching unit 340 shown in FIG. 8, and the region retouching unit 340A includes a detailed retouch region recognizing unit 400 and a detailed retouch region blurring unit 420.

The detailed retouch region recognizing unit 400 recognizes the detailed retouch region in the expanded image region and outputs the recognized detailed retouch region. For example, the detailed retouch region recognizing unit 400 receives the expanded image region from the region expanding unit 320 through an input terminal IN4, recognizes the detailed retouch region set by the user in the expanded image region, and outputs the recognized detailed region.

The detailed retouch region blurring unit 420 blurs the detailed retouch region input from the detailed retouch region recognizing unit 400 and outputs the blurred detailed retouch region. For example, the detailed retouch region blurring unit 420 blurs the detailed retouch region input from the detailed retouch region recognizing unit 400 and outputs the blurred detailed retouch region through an output terminal OUT4.

Figure 10:
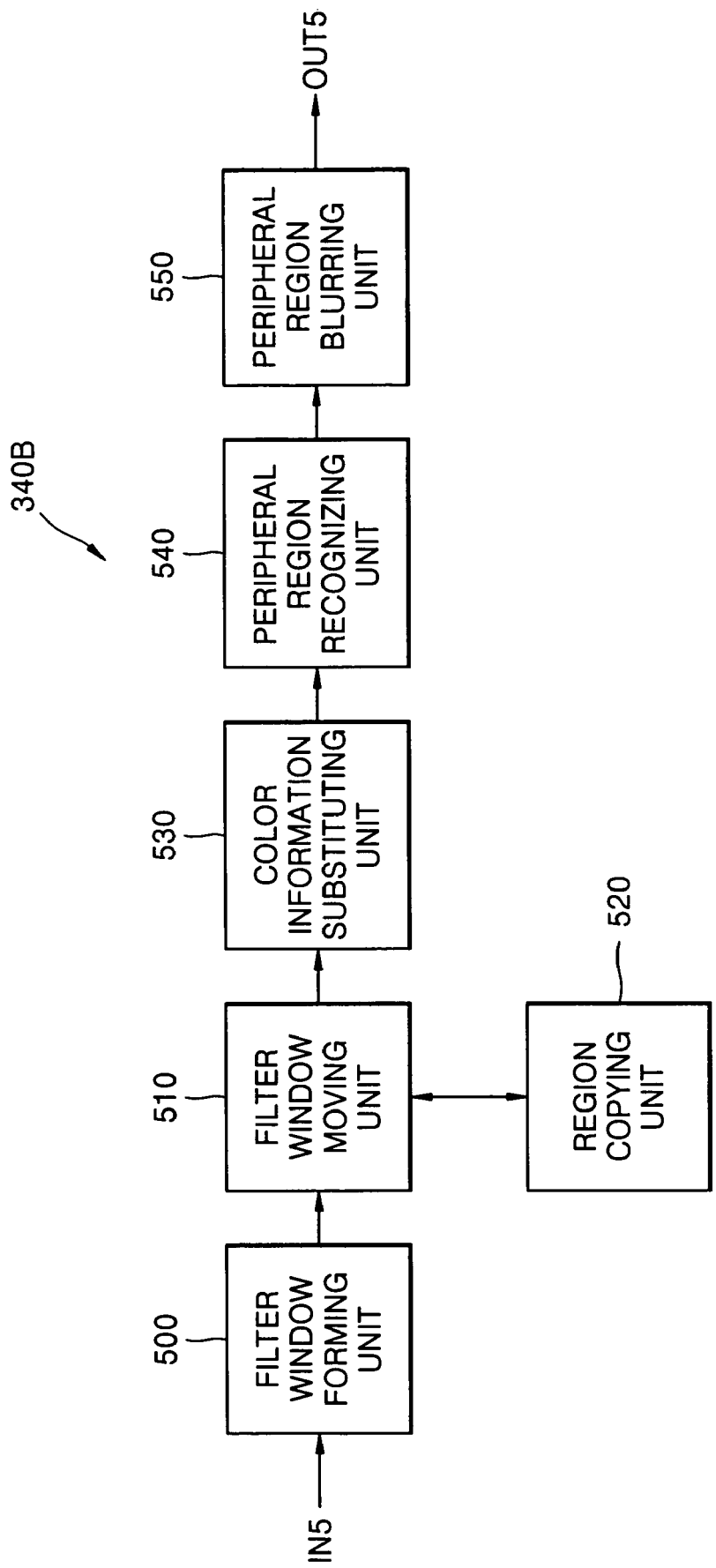
FIG. 10 is a block diagram of another embodiment of a region retouching unit which is shown in FIG. 8.

FIG. 10 is a block diagram of still another embodiment (340B) of the region retouching unit 340 shown in FIG. 8, and the region retouching unit 340B includes a filter window forming unit 500, a filter window moving unit 510, a region copying unit 520, a color information substituting unit 530, a peripheral region recognizing unit 540, and a peripheral region blurring unit 550.

The filter window forming unit 500 forms a second filter window having the same size as the detailed retouch region in the expanded image region and outputs the formed second filter window (step 60). The window formed by the filter window forming unit 500 may be several windows, or may be a window of which the size can be adjusted. For example, the filter window forming unit 500 receives the expanded image region from the region expanding unit 320 through an input terminal IN5, forms the second filter window the same size as the detailed retouch region in the expanded image region, and outputs the second filter window to the filter window moving unit 510.

The filter window moving unit 510 moves the second filter window input from the filter window forming unit 500 onto the screen of a digital camera, and outputs the moved result (steps 62 and 66). For example, the filter window moving unit 510 moves the second filter window to an image region having color information similar to that of the detailed retouch region and outputs the moved result to the region copying unit 520. Also, the filter window moving unit 510 moves the second filter window having a copied image region to the detailed retouch region and outputs the moved result to the color information substituting unit 530.

The region copying unit 520 copies the image region on which the second filter window is disposed in response to receiving of the moved result of the second filter window, and outputs the copied image region (step 64). For example, the region copying unit 520 receives the moved result of the second filter window input from the filter window moving unit 510, copies the color information corresponding to the image region on which the second filter Window is disposed, and outputs the copy result to the filter window moving unit 510.

The color information substituting unit 530 substitutes the color information of the detailed retouch region with the color information of the copied image region in response to receiving the moved result of the second filter window including the copied image region from the filter window moving unit 510, and outputs the substituted result (step 68). For example, the color information substituting unit 530 receives the moved result of the second filter window on the copied image region from the filter window moving unit 510, substitutes the color information of the detailed retouch region with the color information of the image region copied by the region copying unit 520, and outputs the substituted result to the peripheral region recognizing unit 540.

The peripheral region recognizing unit 540 recognizes the peripheral image region, including the substituted image region, in response to receiving the substituted image region from the color information substituting unit 530, and outputs the recognized peripheral image region (step 70). For example, the peripheral region recognizing unit 540 recognizes the image region including edge portions of the second filter window. The size of peripheral image region can be controlled by the user.

The peripheral region blurring unit 550 blurs the recognized peripheral image region input from the peripheral region recognizing unit 540 and outputs the blurred peripheral image region (step 72). That is, the peripheral region blurring unit 550 blurs the peripheral image region input from the peripheral region recognizing unit 540 and outputs the blurred peripheral image region through an output terminal OUT5. Therefore, fine noise shown in an image can be removed through blurring.

Figure 11:
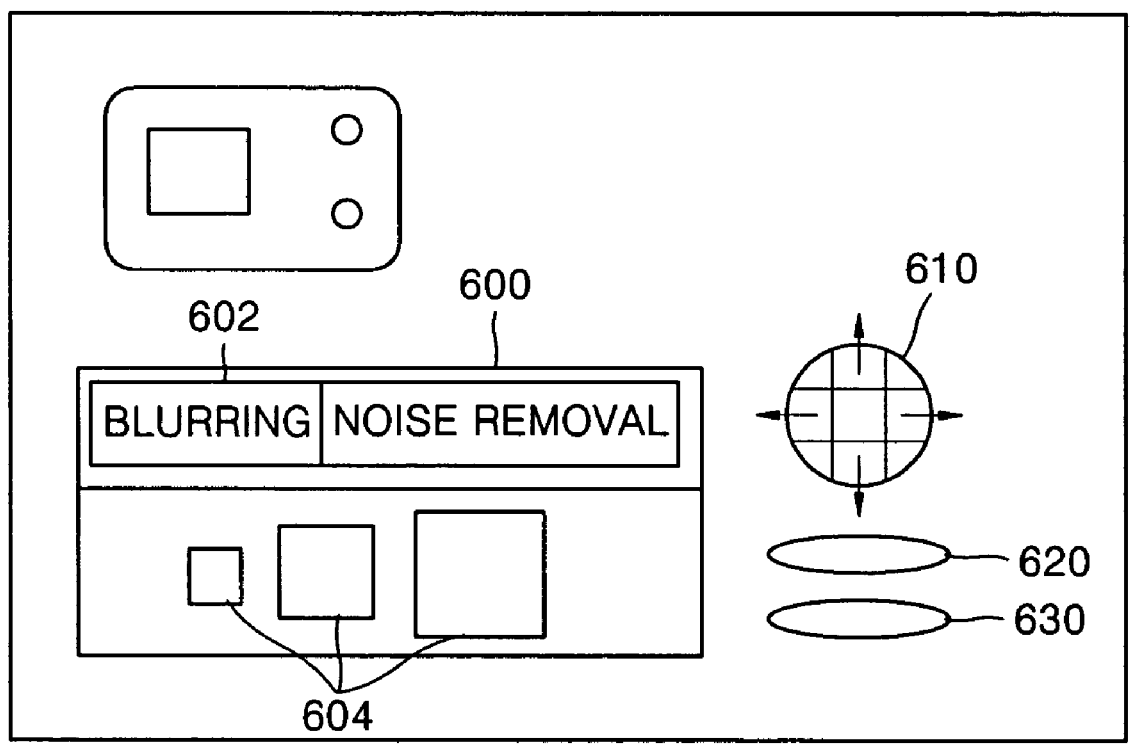
FIG. 11 is a view of the function keys located on the rear surface of a digital camera.

FIG. 11 is a view of the functional keys located on the rear surface of a digital camera directed to the present invention, the keys include an image display unit 600, a filter window moving key 610, a blurring key 620, and an impurity removal key 630. The image display unit 600 displays the photographed image, the filter window moving key 610 moves the filter window by the filter window moving unit 210 or 510, the blurring key 620 performs the functions of the blurring unit (not shown) or the detailed retouch region blurring unit 420, the impurity removing key 630 performs the functions of the filter window forming unit 200 or 500, the filter window moving unit 210 or 510, the region copying unit 220 or 520, and the color information substituting unit 230 or 530. The image display unit 600 of FIG. 11 displays a filter window 604 selectively formed by the filter window forming unit 500 of FIG. 10, and a blurring or impurity removal mode 602 enacted by the blurring key 620 or the impurity removal key 630.

Figure 12:
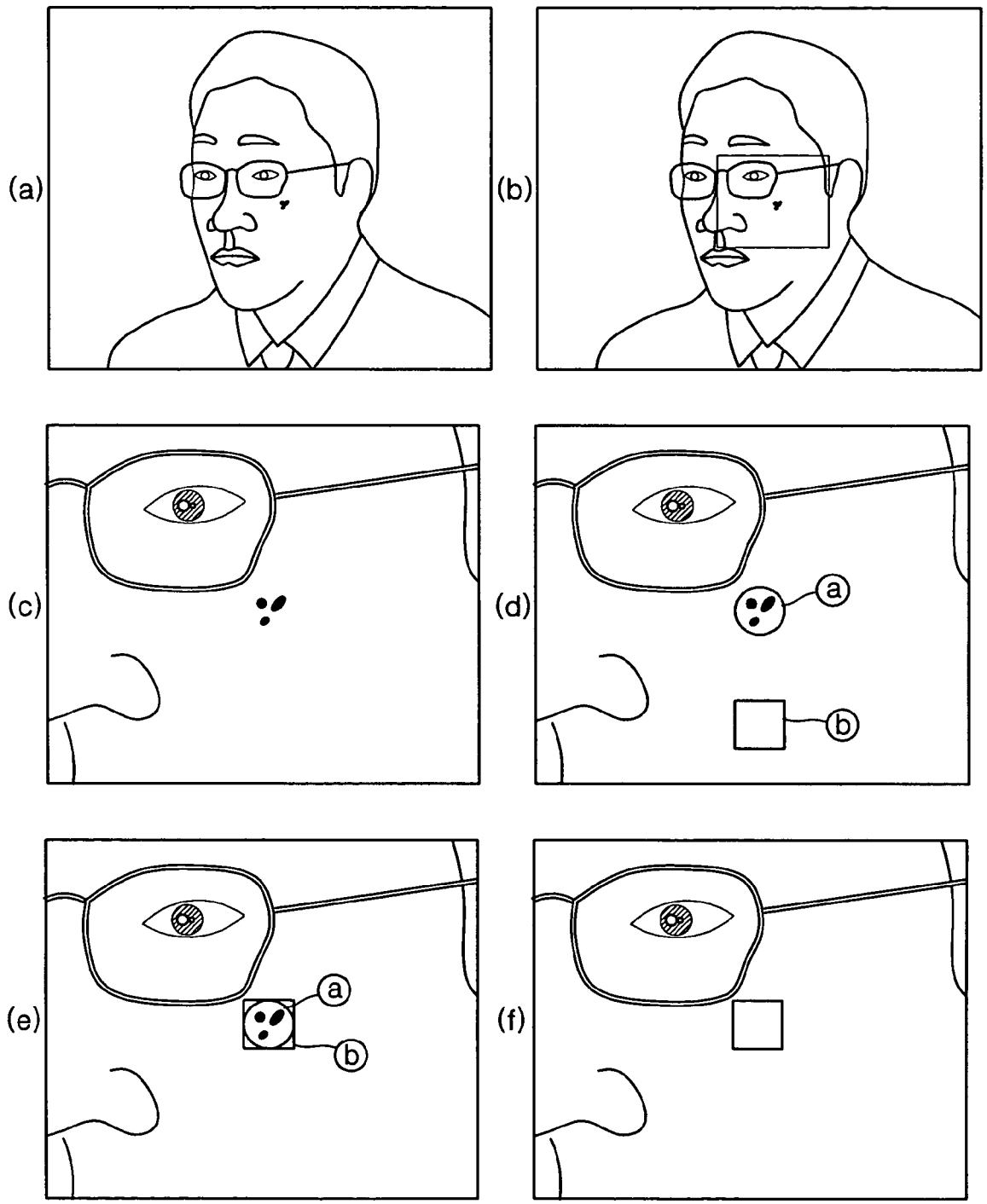
FIG. 12 is an exemplary view of removing impurities, such as blemishes on a face in a photographed image, by employing a retouching apparatus as shown in FIGS. 8 through 10.

FIG. 12 is an exemplary view of the process of removing impurities using the photographed image retouch apparatus shown in FIGS. 8 through 10.

FIG. 12 (*a*) is a view of a photographed image containing impurities which a user has set on the image display unit 600.

FIG. 12 (*b*) is a view of a certain region recognized by the region recognition unit 300 shown in FIG. 8 when the user selects the impurity removing key 630 of FIG. 11, thereby relaying detailed information of the region on which the impurities exist.

FIG. 12 (*c*) is a view of a particular region expanded by the region expanding unit 320 which allows the user to clearly identify the region on which the impurities exist in the expanded image.

FIG. 12 (*d*) is a view of the second filter window disposed on an image region (b) having color information similar to that of the region on which the impurities exist using the filter window moving key 610 of FIG. 11. Here, the second filter window corresponding to the image region (b) having similar color information is formed by the filter window forming unit 500 shown in FIG. 10.

FIG. 12 (*e*) is a view of the image region (b) having similar color information moved to the predetermined region (a) on which impurities exist. The image region (b) having similar color information is copied by the region copying unit 520 shown in FIG. 10, moved by the filter window moving unit 510, and displayed as (e) of FIG. 12. FIG. 12 (*f*) is a view of the image region (a) on which the impurities exist substituted with the image region ⓑ having similar color information to that of the image region ⓐ; thus, the image region ⓐ is substituted by the color information substituting unit 530 of FIG. 10 and displayed with no impurities.

The blurring process may be performed additionally for the image region on which the impurities are removed to obtain a desired image.

As described above, according to the method and apparatus for retouching the photographed image of the present invention, a photographed image can be retouched directly on a digital camera without the need for a computer while portable printers for the digital camera are distributed widely.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for retouching a photographed image using a digital camera, comprising:
   a region recognition unit for recognizing an image region which is to be retouched in the photographed image and outputting the recognized image region, the region recognition unit including a first button located on the digital camera, the first button operable to initiate a window moving function for defining a recognized image region which is to be retouched; and
   a region retouch unit for retouching the recognized image region input from the region recognition unit, and outputting the retouched result,
   the region retouch unit being different from the region recognition unit and including a second button located on the digital camera adjacent to the first button, the second button operable to initiate only a retouching function of the recognized image region; wherein the region retouch unit further comprises a filter window forming unit for forming a first filter window having the same size as the recognized image region and outputting the formed first filter window, a filter window moving unit for moving the first filter window input from the filter window forming unit on a screen of the digital camera and outputting the moved result, a region copying unit for copying the image region on which the first filter window is disposed in response to receiving of the moved result of the first filter window, and outputting the copied image region, a color information substituting unit for substituting the color information of the recognized image region with that of the copied image region in response to receiving of the moved result of the first filter window including the copied image region from the filter window moving unit, and outputting the substituted image region, a peripheral region recognizing unit for recognizing a peripheral image region including the substituted image region in response to receiving of the substituted image region from the color information substituting unit, and outputting the recognized peripheral image region, and a peripheral region blurring unit for blurring the recognized peripheral image region input from the peripheral region recognizing unit, and outputting the blurred peripheral image region.

2. The apparatus of claim 1, wherein the region retouch unit further includes a third button adjacent to the first and second buttons, the third button operable to initiate blurring of the recognized image region, the region retouch unit outputting the blurred image region.

3. The apparatus of claim 1, wherein the filter window forming unit forms windows having several selective sizes.

4. The apparatus of claim 1 further comprising a region expanding unit for expanding the recognized image region input from the region recognition unit and outputting the expanded image region, wherein the region retouch unit retouches the expanded image region input from the region expanding unit and outputs the retouched image region.

5. The apparatus of claim 4, wherein the region retouch unit comprises:
   a detailed retouch region recognizing unit for recognizing the detailed retouch region in the expanded image region and outputting the recognized detailed retouch region; and
   a detailed retouch region blurring unit for blurring the detailed retouch region input from the detailed retouch region recognizing unit and outputting the blurred detailed retouch region.

6. The apparatus of claim 4, wherein the region retouch unit comprises:
   a filter window forming unit for forming a second filter window having the same size as the detailed retouch region in the expanded image region and outputting the formed second filter window;
   a filter window moving unit for moving the second filter window inputted from the filter window forming unit on a screen of the digital camera, and outputting the moved result;
   a region copying unit for copying the image region on which the second filter window is disposed in response to receiving of the moved result of the second filter window, and outputting the copied image region; and
   a color information substituting unit for substituting the color information of the detailed retouch region with the color information of the copied image region in response to receiving of the moved result of the second filter window having the copied image region from the filter window moving unit, and outputting the substituted image region.

7. The apparatus of claim 6, wherein the filter window forming unit forms several windows having selective sizes.

8. The apparatus of claim 6, wherein the region retouch unit further comprises:
   a peripheral region recognizing unit for receiving the substituted image region from the color information substituting unit, recognizing a peripheral image region including the substituted image region, and outputting the recognized peripheral image region; and
   a peripheral region blurring unit for blurring the peripheral image region input from the peripheral region recognizing unit and outputting the blurred peripheral image region.

* * * * *